(12) United States Patent
Grewing et al.

(10) Patent No.: US 8,063,508 B2
(45) Date of Patent: Nov. 22, 2011

(54) POWER SUPPLY SCHEME FOR REDUCED POWER COMPENSATION

(75) Inventors: Christian Grewing, Sollentuna (SE); Stefan Heinrich van Waasen, Kolbermoor (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/647,147

(22) Filed: Dec. 24, 2009

(65) Prior Publication Data

US 2010/0164283 A1 Jul. 1, 2010

Related U.S. Application Data

(62) Division of application No. 11/781,138, filed on Jul. 20, 2007, now Pat. No. 7,679,216.

(51) Int. Cl.
*H02J 3/14* (2006.01)

(52) U.S. Cl. ......................................................... 307/31
(58) Field of Classification Search .................... 307/63, 307/31, 71
See application file for complete search history.

(56) References Cited

U.S. PATENT DOCUMENTS

| | | | |
|---|---|---|---|
| 6,462,950 B1 * | 10/2002 | Pohjonen ....................... 361/704 |
| 6,479,974 B2 * | 11/2002 | Cohn et al. .................... 323/312 |
| 7,045,915 B2 * | 5/2006 | Otani et al. ..................... 307/75 |
| 7,594,127 B2 * | 9/2009 | Sutardja ........................ 713/300 |
| 2007/0262438 A1 * | 11/2007 | Choa-Eoan et al. .......... 257/691 |

* cited by examiner

*Primary Examiner* — Michael Rutland Wallis
(74) *Attorney, Agent, or Firm* — SpryIP, LLC

(57) ABSTRACT

A power control system is described that reuses current from segregated circuits of the mobile device. In some embodiments, the segregated circuits (or "sections") can be "stacked" in series (with respect to the power supply) such that power is more efficiently used. The power can be more efficiently used by arranging a first section to reuse current that supplies power to a second section. A power control unit can be used to control regulators.

4 Claims, 3 Drawing Sheets

POWER SUPPLY SCHEME FOR REDUCED POWER COMPENSATION

RELATED CASES

This Application is a Divisional Application of application Ser. No. 11/781,138, which was filed on Jul. 20, 2007 now U.S. Pat. No. 7,679,216. The priority of the Application is hereby claimed and the contents thereof incorporated herein by reference.

BACKGROUND

CMOS technologies are commonly used to build components of communication systems. However, conventional portable devices (such as cordless telephones, cell phones, mobile devices, and the like) typically have a power supply that delivers higher voltages than are required for CMOS circuitry. Accordingly, voltage regulators are used to provide voltages that are suitable for the CMOS circuitry.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Figure 1:
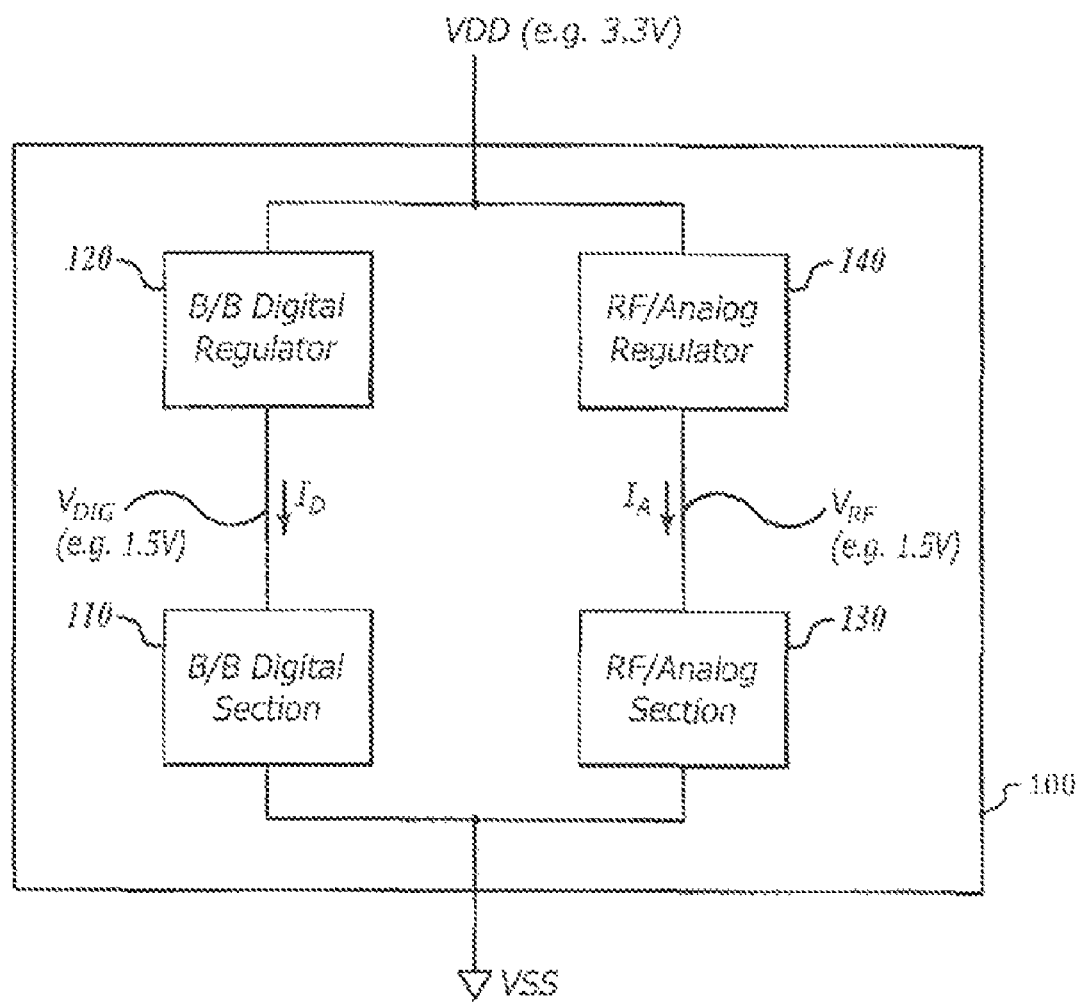
FIG. 1 is a schematic diagram that illustrates a conventional power scheme for a mobile device.

Various embodiments of the present disclosure will be described in detail with reference to the drawings, where like reference numerals represent like parts and assemblies throughout the several views. In the figures, the left-most digit(s) of a reference number identifies the figure in which the reference number first appears. The use of the same reference numbers in different figures indicates similar or identical items. Reference to various embodiments does not limit the scope of the disclosure, which is limited only by the scope of the claims attached hereto. Additionally, examples set forth in this specification are not intended to be limiting and merely set forth some of the many possible embodiments contemplated in the present disclosure.

Briefly stated, the present disclosure is generally related to an improved power supply scheme for a mobile device in accordance with an implementation described herein that reuses current from segregated circuits of the mobile device. In some embodiments, the segregated circuits (or "section") can be "stacked" in series (with respect to the power supply) such that power can be more efficiently used.

In some example embodiments, a voltage of greater than three volts can be applied to a digital circuit section that is configured in series with an analog circuit section. A power control unit can be arranged to monitor the current through each section. Each segregated section has a controlled voltage regulator in parallel with each segregated section. The voltage regulator for each segregated section is dynamically controlled by the power control unit such that an intermediate node between the digital circuit section and the analog circuit section can be driven to 1.5 volts. The voltage of the intermediate node (e.g., 1.5 volts for this example) is suitable for driving the CMOS technologies used by the circuits of both segregated sections.

Overview

In the following, a brief discussion of a conventional power supply scheme for a mobile device is provided. Subsequently, a detailed description of an improved power supply scheme for a mobile device is provided. Both the system- and method-related details associated with the improved power scheme for a mobile device are provided herein.

Conventional Power Supply Scheme

The discussion herein concerning conventional technology and solutions is made while having knowledge of the instant disclosure and hindsight appreciation of the conventional technology. Accordingly, characterizations of conventional technology described herein do not negative patentability of the instant claims.

FIG. 1 is a schematic diagram that illustrates a conventional power scheme for a mobile device. Mobile device 100 comprises a baseband/digital circuitry section 110 and a radio frequency/analog circuitry section 130. A first voltage regulator 120 is disposed between a power source (i.e., VDD) of the mobile device and the baseband/digital circuitry section 110. A second voltage regulator 140 is disposed between the power source (i.e., VDD) of the mobile device and the radio frequency/analog circuitry section 130. Each circuitry section is typically couple to ground.

The power source (VDD) is typically greater than three volts. Voltage regulator 120 regulates the supplied voltage, for example, down to around 1.5 volts (VDIG). Voltage regulator 140 regulates the supplied voltage, for example, down to around 1.5 volts (VRF). Each regulated voltage (VDIG and VRF) is supplied to respective circuitry sections (110 and 140) such that currents ID and IA are provided to a respective circuit section. The present disclosure recognizes that the amount of power consumed by the voltage regulation can exceed the amount of power used by the circuits themselves.

The present disclosure identifies that current from each circuitry section (i.e., 110 and 140) is not reusable when the voltage associated with the return signal path for the power supply of the each circuitry section is at the ground potential. Even if the voltage at the output of the section is higher than ground, the current cannot normally be reused when the output voltage is less than the operating voltage requirements of the circuits.

Because each circuitry section (i.e. 110 and 140) typically consumes differing amounts of power (and may require different voltages), the amount of power loss between the circuitry sections normally differs. For example, the current (IRF) used in the radio frequency/analog circuitry section (140) can range as high as several tenths of milliamps, which can be several orders of magnitude greater than the currents used by the baseband/digital circuitry section (110).

Example Arrangements

Figure 2:
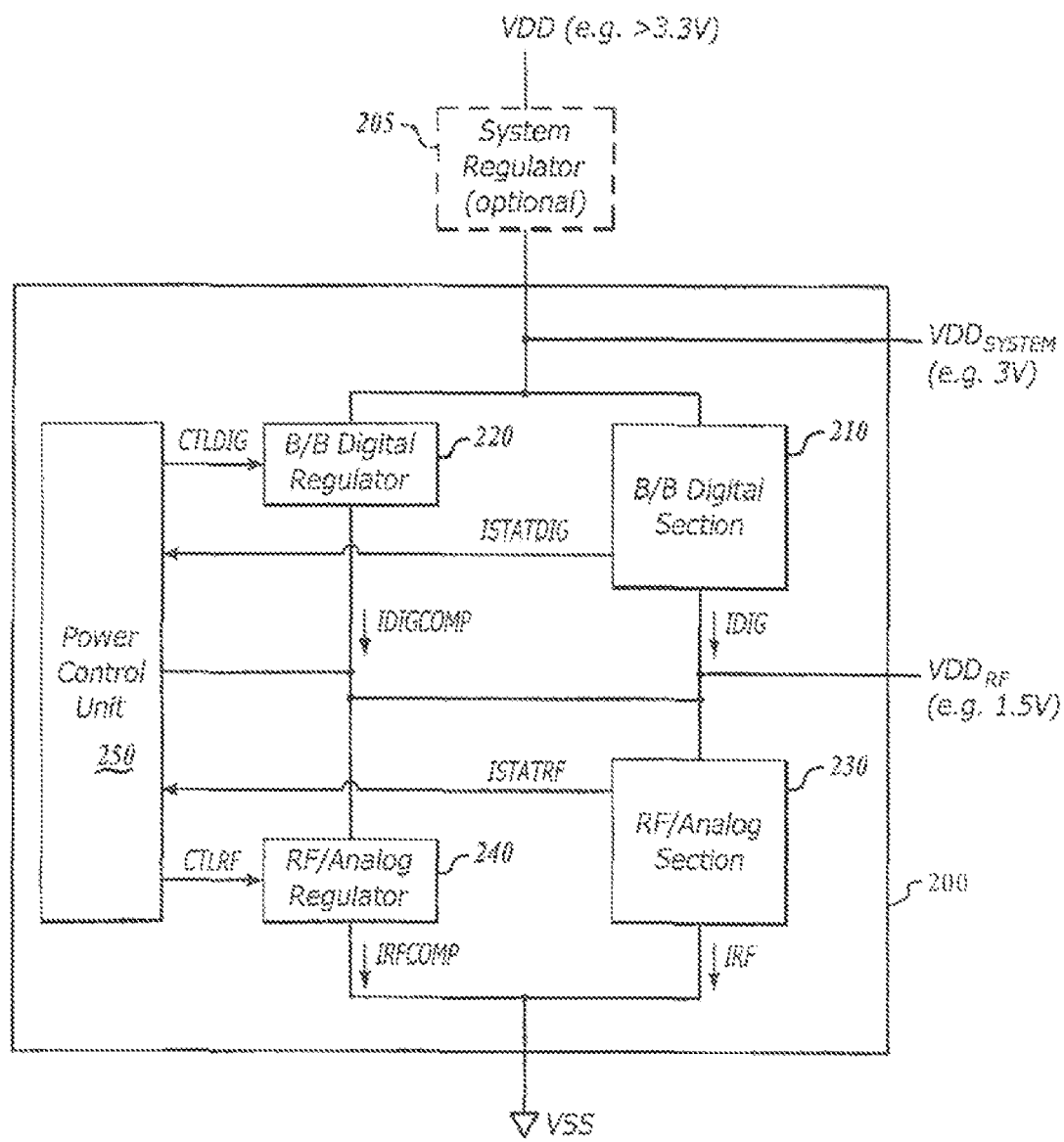
FIG. 2 is a schematic diagram illustrating an improved power supply scheme for a mobile device in accordance with embodiments of the present disclosure.

FIG. 2 is a schematic diagram illustrating an improved power supply scheme for a mobile device 200 in accordance with embodiments of the present disclosure. Mobile device 200 is powered by a voltage source (such as a battery) that is greater than the power supply requirements for CMOS circuit operation (e.g., VDD=3V, VDD>1.5V). The voltage source is optionally applied to a regulator system 205, which can be omitted when, for example, the voltage source is stable enough to drive circuitry of the mobile device (200).

Mobile device 200 comprises a baseband/digital circuitry section 210, a voltage regulator 220 for the baseband/digital circuitry section 210, a radio frequency/analog circuitry section 230, a voltage regulator 240 for the radio frequency/analog circuitry section 230, and a power control unit 250.

Voltage regulator 220 and baseband/digital circuitry section 210 are disposed electrically between a power source of the mobile device (VDDSYSTEM) and an intermediate node (VDDRF). Power source VDDSYSTEM is typically around three volts. Intermediate node VDDRF typically acts as the "ground" of the baseband/digital circuitry section 230 and is driven (under the control of the power control unit 250, described below) to around 1.5 volts with respect to a system ground (GND). Accordingly, the voltage difference between node VDDSYSTEM and node VDDRF (which is typically around 1.5 volts) is typically sufficient to drive the circuitry within the baseband/digital circuitry section 210.

The voltage difference between VDD and VSS is nominally about 3V, and the intermediate node can be, for example, a mid-supply voltage between VDD and VSS (e.g., VMID=[VDD−VSS]/2). In one example VSS is a ground return terminal with a voltage corresponding to 0V, and VDD is a power supply terminal with a voltage corresponding to 3V. In another example VDD is a power supply terminal with a voltage corresponding to 1.5V, and VSS is a ground return terminal with a voltage corresponding to −1.5V. Other supply voltage can have a difference of greater than 3V such as, for example, 3.1V, 3.2V, 3.2V, 3.3V, 3.5V, 3.75V, 5V, and the like. Supply voltages may also have a difference of less than 3V such as, for example, 2.7V, 2.5V, 2.4V, 2.2V, 2.1V, 2.0V, and the like.

Voltage regulator 240 and the radio frequency/analog circuitry section 230 are disposed electrically between the intermediate node (VDDRF) and power supply return terminal (VSS). Intermediate node VDDRF is typically around 1.5 volts, which is typically sufficient to drive the circuitry within the radio frequency/analog circuitry section 230.

The segregated circuitry sections are stacked such that the sections are electrically coupled in series with respect to the power supply terminals (VDD and VSS). The stacked arrangement allows current to be reused such that power is conserved. However, as mentioned above, the currents of each segregated section (210 and 230) are typically not equal. The voltage regulators (220 and 240) are arranged to operate in conjunction with the power control unit 250 to compensate for "missing" currents such the currents flowing into node VDDRF are approximately equal to the currents flowing into the power supply ground return.

As shown in FIG. 2, baseband/digital circuitry section 210 operates with a current DIG, which is coupled to node VDDRF. The baseband/digital circuitry section 210 is arranged to provide a status indication signal (ISTATDIG) to power control unit 250 that represents the amount of current being used by the section.

Also, radio frequency/analog circuitry section 230 operates with a current IRF, which is coupled to the ground return terminal. The radio frequency/analog circuitry section 230 is arranged to provide a status indication signal (ISTATRF) to power control unit 250 that represents the amount of current being used by the section.

Power control unit 250 is arranged to receive the current information from each segregated circuitry section. In response to the current information, power control unit 250 signals each voltage regulator 220 and 240 to selectively provide a balancing current (if needed) such that VDDRF is driven to the desired value (e.g., a mid-supply voltage such as [VDD−VSS]/2).

Accordingly, power control unit 250 signals regulator 240 to selectively adjust the balancing current IRFCOMP when IDIG is greater than IRF. Similarly, control unit 250 signals regulator 220 to selectively adjust the balancing current IDIGCOMP when IRF is greater than IDIG. Thus, a current from a regulator of a first segregated section is summed with the current used by the first segregated section such that the combined currents provide the current for the second segregated section.

In some examples, both segregated sections are active and the current total (IDIG) of the baseband/digital section 210 is typically around two orders of magnitude less than the current total (IRF) of RF/analog section 230. Accordingly, the power control unit 250 determines the relative currents of each segregated section. In response, the power control unit 250 signals the baseband/digital voltage regulator to supply current IDIGCOMP such that the current total of the baseband/digital section 210 and the baseband/digital voltage regulator 220 is equal to the current of the RF/analog section 230 (i.e., IRF=IDIG+IDIGCOMP). The current supplied by the baseband/digital voltage regulator (220) helps to maintain the voltage at node VDDRF at a desired value (e.g., 1.5 volts).

In other examples, the baseband/digital section 210 is active when the RF/analog section 230 is inactive, such that the baseband/digital section 210 is the only section drawing power. Accordingly, the power control unit 250 determines the amount of current consumed by the baseband/digital section 210 and signals the RF/analog regulator 240 to supply enough current IRFCOMP such that the current total of the RF/analog voltage regulator 240 is equal to the current consumed by the baseband/digital section 210 (i.e., IDIG=IRF+IRFCOMP). The current (IRFCOMP) supplied by the RF/analog voltage regulator 240 helps to maintain the voltage at node VDDRF at a desired value (e.g., 1.5 volts).

Grouping the radio frequency/analog circuitry 230 into one section and the baseband/digital circuitry 210 into another section can be done for various convenient reasons. For example, noise isolation is improved when digital and analog circuits are separated. In other examples functionally related circuits are operated together. It can be seen from the present disclosure that the sections can be grouped such that the currents going through each section are approximately equal such that current reuse is maximized (and power consumption is minimized). In other examples, functionally related portions of the circuitry are stacked such that current is reused when the functionally related portions are enabled and drawing power.

The radio frequency/analog circuitry section 230 and the baseband/digital circuitry section 210 can be located on the same or separate substrates (for noise isolation, among other reasons). It can be seen that, for example, a double-well (and/or multiple-well) semiconductor manufacturing process can be used such that two sections of circuitry can be implemented on the same substrate, wherein at least one section has a "floating" (isolated) ground with respect to the other section. Voltage isolation techniques (such as power supply decoupling capacitors, careful ground return designs such as guard rings and power supply/ground return trenches) can be used to reduce ground noise (such as noise from the baseband/digital section 210) in the RF/analog section 230.

Procedure

The following discussion describes procedures that may be realized utilizing the previously described implementations herein. The procedures are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are presented is not intended to be construed as a limitation, and any number of the described blocks can be combined in any order and/or in parallel to implement the process. In portions of the following discussion, reference may be made to the illustrations of FIGS. 1-2 and the subject matter thereof.

Figure 3:
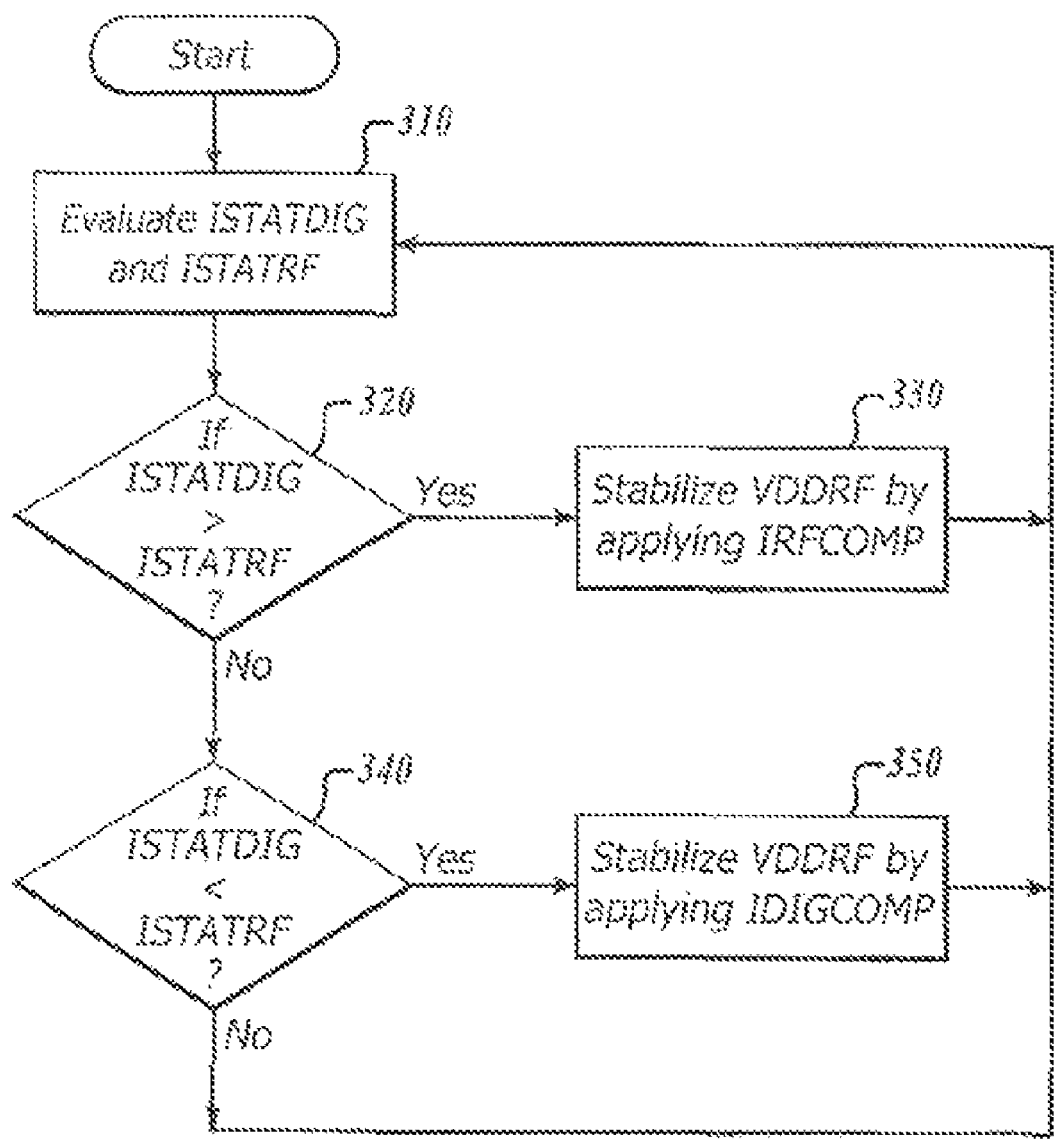
FIG. 3 is a process flow diagram that illustrates a number of operations associated with a control process and/or mechanism for embodiments of an improved power scheme for a mobile device arranged according to the present disclosure.

FIG. 3 is a process flow diagram that illustrates a number of operations associated with a control process and/or mechanism for embodiments of an improved power scheme for a mobile device arranged according to the present disclosure. Processing begins at block 310.

At block 310, signals ISTATDIG and ISTATRF are evaluated. Signal ISTATDIG is a signal that represents a magnitude of the current (e.g., DIG) drawn by the baseband/digital circuitry section 210. Signal ISTATRF is a signal that represents a magnitude of the current (e.g., IRF) drawn by the radio frequency/analog circuitry section 230.

At block 320, the process determines whether ISTATDIG is greater than ISTATRF. Processing continues from block 320 to block 330 when ISTATDIG is greater than ISTATRF. Otherwise, processing continues from block 320 to block 340 when ISTATDIG is not greater than ISTATF.

At block 330, the intermediate node VDDRF is driven to a desired intermediate voltage by selectively applying the compensation current IRFCOMP (which is generated by a regulator in series with the RF/analog circuitry section 230). The compensation current is combined with reused current from the RF/analog circuitry section 230 to save power.

At block 340, the process determines whether ISTATRF is greater than ISTATDIG. Processing continues from block 340 to block 350 when ISTATRF is greater than ISTATDIG. Otherwise processing continues from block 340 to block 310 when ISTATRF is not greater than ISTATDIG (indicating that ISTATRF=ISTATDIG).

In block 350, the intermediate node VDDRF is driven to a desired intermediate voltage by applying the compensation current IDIGCOMP (which is generated by a regulator in series with the baseband/digital circuitry section 210). The compensation current is combined with reused current from the baseband/digital circuitry section 210 to save power.

CONCLUSION

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A method for controlling power for a first section of circuitry and a second section of circuitry, comprising:
    evaluating a first signal that indicates a magnitude of a first current that is drawn by the first section of circuitry;
    evaluating a second signal that indicates a magnitude of a second current that is drawn by the second section of circuitry;
    in response to the first and second evaluations, determining the greater of the first and second currents;
    if the first current is greater than the second current, adding a first compensation current to the second current to provide a third current that is equal to the first current, and using the third current to drive a voltage at an intermediate node; and
    if the second current is greater than the first current, adding a second compensation current to the first current to provide a forth current that is equal to the second current, and using the forth current to drive a voltage at an intermediate node.

2. The method according to claim 1, wherein the first and second sections of circuitry are on different substrates.

3. The method according to claim 1, wherein the first and second sections of circuitry are implemented in isolated wells of a single substrate.

4. The method according to claim 1, wherein the first section of circuitry comprises digital circuitry and the second section of circuitry comprises analog circuitry.

* * * * *